United States Patent
Sauer

(10) Patent No.: US 10,710,435 B2
(45) Date of Patent: Jul. 14, 2020

(54) SHADING DEVICE FOR A PANE OR A GLASS ROOF REGION OF A VEHICLE INTERIOR

(71) Applicant: BOS GMBH & CO., KG., Ostfildern (DE)

(72) Inventor: Roman Sauer, Grossbettlingen (DE)

(73) Assignee: BOS GMBH & CO. KG, Ostfildern (DE)

( * ) Notice: Subject to any disclaimer, the term of this patent is extended or adjusted under 35 U.S.C. 154(b) by 303 days.

(21) Appl. No.: 15/567,126

(22) PCT Filed: May 3, 2016

(86) PCT No.: PCT/EP2016/059834
§ 371 (c)(1),
(2) Date: Oct. 17, 2017

(87) PCT Pub. No.: WO2016/192913
PCT Pub. Date: Dec. 8, 2016

(65) Prior Publication Data
US 2018/0099544 A1   Apr. 12, 2018

(30) Foreign Application Priority Data
Jun. 1, 2015  (DE) .................... 10 2015 210 093

(51) Int. Cl.
*B60J 1/20* (2006.01)

(52) U.S. Cl.
CPC .......... *B60J 1/2038* (2013.01); *B60J 1/2044* (2013.01)

(58) Field of Classification Search
CPC ...... B60J 1/2038; B60J 1/2044; B60J 1/2041; B60J 1/2063; B60J 1/2075; B60J 1/2066;
(Continued)

(56) References Cited

U.S. PATENT DOCUMENTS 2,709,107 A    5/1955  Hoffman
6,814,382 B2 * 11/2004 Kohara .................. B60J 5/0418
                                                        296/1.03
(Continued)

FOREIGN PATENT DOCUMENTS

CN    1974250 A      6/2007
DE    101 44 523 A1   3/2003
(Continued)

OTHER PUBLICATIONS

Jincheleau, English Translation of "EP 0882609", obtained from <https://worldwide.espacenet.com/?locale=en_EP>. (Year: 1998).*
(Continued)

*Primary Examiner* — Johnnie A. Shablack
(74) *Attorney, Agent, or Firm* — Flynn Thiel, P.C.

(57) ABSTRACT

A shading device for a pane or a glass roof region of a vehicle interior with a flexible shading structure mounted for, movement between a rest position in which it is stowed in a receiving region in a compact manner, and a shading position, in which it spans the pane or the glass roof region, and which is provided with a dimensionally stable pull-out profile. The pull-out profile extends substantially over an entire width of the shading structure and is positioned in a passage slot of the receiving region in the rest position of the shading structure. Resilient damping elements are arranged on opposite longitudinal walls of the passage slot, which damping elements flank the pull-out profile in the rest position of the shading structure and support the pull-out profile at a distance from the longitudinal walls.

18 Claims, 3 Drawing Sheets

(58) Field of Classification Search
CPC ........ B60J 1/2077; B60J 1/208; B60J 1/2083;
B60J 1/2086; B60J 1/2013; B60J 7/0015;
B60J 10/70; B60J 10/82; B60J 10/84
See application file for complete search history.

(56) References Cited

U.S. PATENT DOCUMENTS

| | | | |
|---|---|---|---|
| 7,393,048 B2 | 7/2008 | Mori | |
| 7,401,840 B2* | 7/2008 | Schnoblen | B60J 1/2044 |
| | | | 160/370.22 |
| 7,934,533 B2 | 5/2011 | Walter et al. | |
| 8,646,828 B2* | 2/2014 | Haase | B60J 1/2041 |
| | | | 296/146.1 |
| 9,132,717 B2* | 9/2015 | Usami | B60J 1/2063 |
| 9,469,178 B2* | 10/2016 | Lee | B60J 1/2063 |
| 10,202,025 B2* | 2/2019 | Bott | B60J 7/0015 |
| 10,272,756 B2* | 4/2019 | Sia, Jr. | B60J 10/32 |
| 2003/0075878 A1* | 4/2003 | Sehr | F16B 5/123 |
| | | | 277/630 |
| 2004/0036234 A1* | 2/2004 | Plottnik | B60J 10/24 |
| | | | 277/642 |
| 2006/0079167 A1* | 4/2006 | Krause | B60J 10/24 |
| | | | 454/121 |
| 2009/0205792 A1* | 8/2009 | Brendel | B60J 1/2044 |
| | | | 160/370.22 |
| 2009/0211164 A1* | 8/2009 | Oerke | B60J 10/24 |
| | | | 49/493.1 |
| 2012/0180960 A1* | 7/2012 | Oya | B60J 1/2038 |
| | | | 160/370.21 |
| 2013/0312330 A1* | 11/2013 | Sturgell | B60J 10/24 |
| | | | 49/70 |
| 2013/0320705 A1* | 12/2013 | Okada | B60R 13/0243 |
| | | | 296/146.2 |
| 2017/0158032 A1* | 6/2017 | Yun | B60J 1/2086 |
| 2018/0099544 A1* | 4/2018 | Sauer | B60J 1/2044 |
| 2018/0178634 A1* | 6/2018 | Sauer | B60J 1/2038 |

FOREIGN PATENT DOCUMENTS

| | | | | |
|---|---|---|---|---|
| DE | 10 2006 037 149 B4 | | 2/2008 | |
| DE | 10211657 B4 * | | 2/2009 | ............ B60R 13/02 |
| DE | 10 2009 003 641 A1 | | 2/2010 | |
| EP | 0882609 A1 * | | 12/1998 | ............ B60J 1/2011 |
| EP | 1129872 A1 | | 9/2001 | |
| EP | 1302347 A1 * | | 4/2003 | ............ B60J 1/2038 |
| EP | 1541419 A1 * | | 6/2005 | ............ B60J 1/2063 |
| EP | 1 738 960 B1 | | 1/2007 | |
| EP | 1826045 A1 | | 8/2007 | |
| FR | 2764244 A1 * | | 12/1998 | ............ B60J 1/2011 |
| FR | 2774947 A1 * | | 8/1999 | ............ B60J 1/2011 |

OTHER PUBLICATIONS

International Search Report issued in Application No. PCT/EP2016/059834 with English translation dated Aug. 5, 2016 (6 pages).
Written Opinion of International Searching Authority issued in Application No. PCT/EP2016/059834 dated Aug. 5, 2016 (6 pages).
Office Action of German Patent Office issued in Application No. 10 2015 210 093.6 dated Feb. 19, 2016 (5 pages).
Chinese Office Action issued in corresponding Chinese Application No. 201680032130.0, dated Apr. 22, 2020 (9 pages).

* cited by examiner

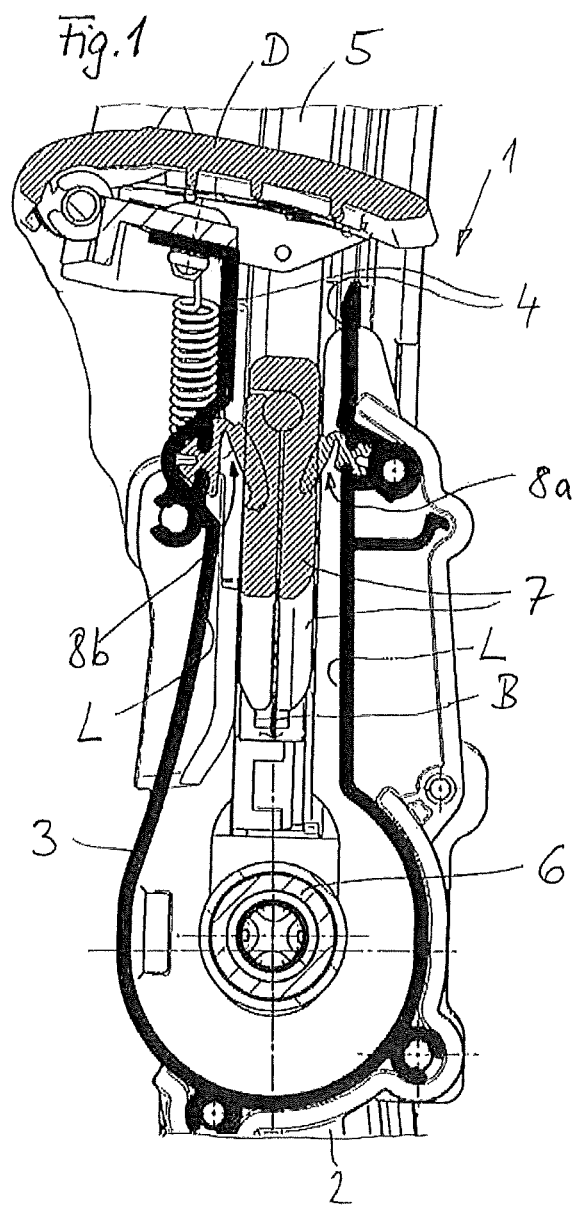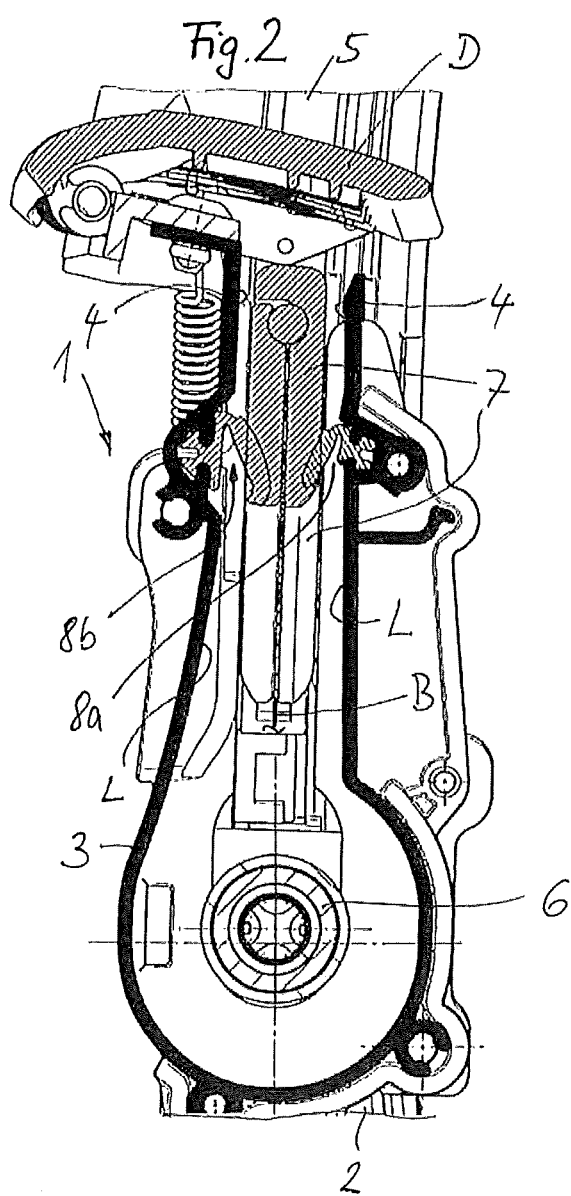

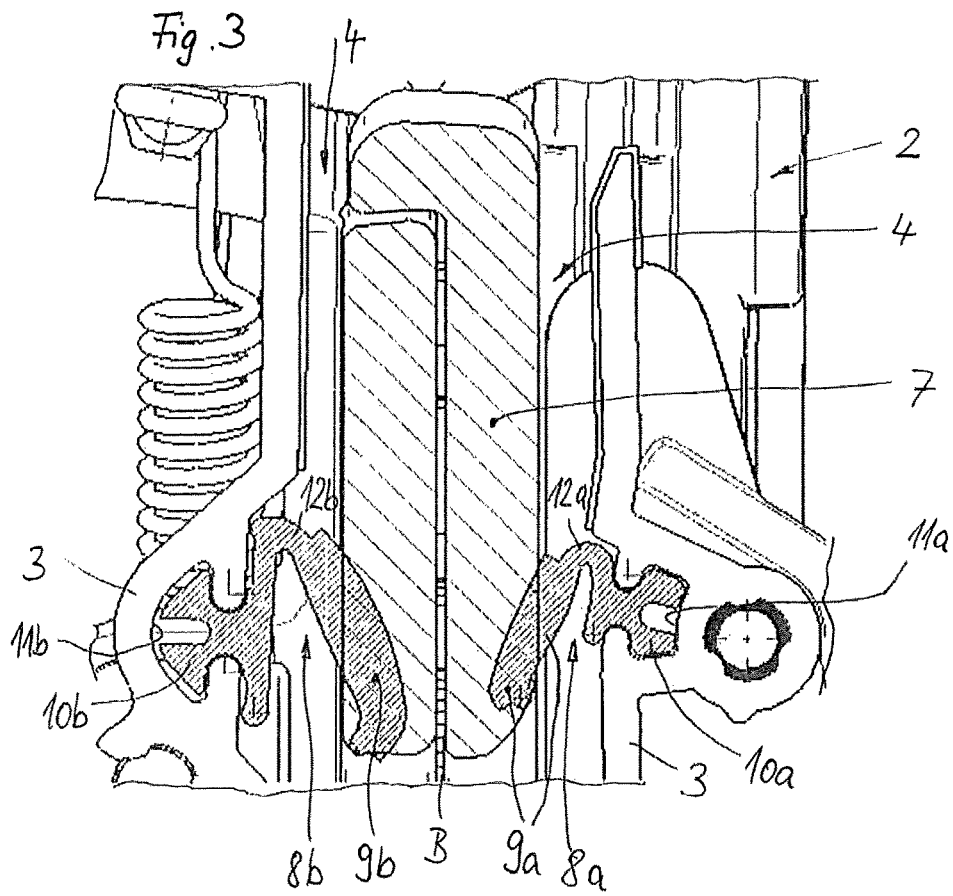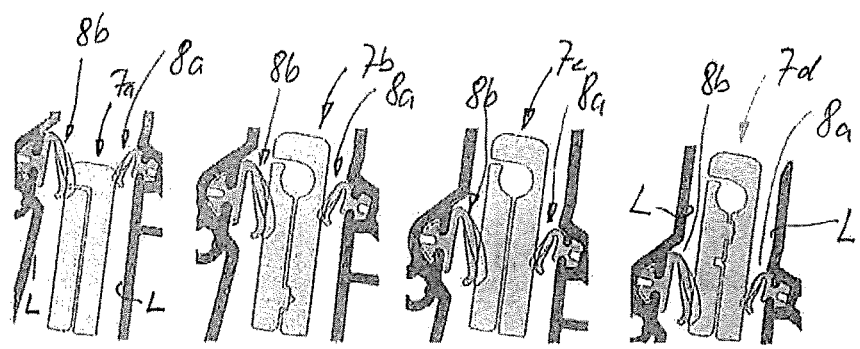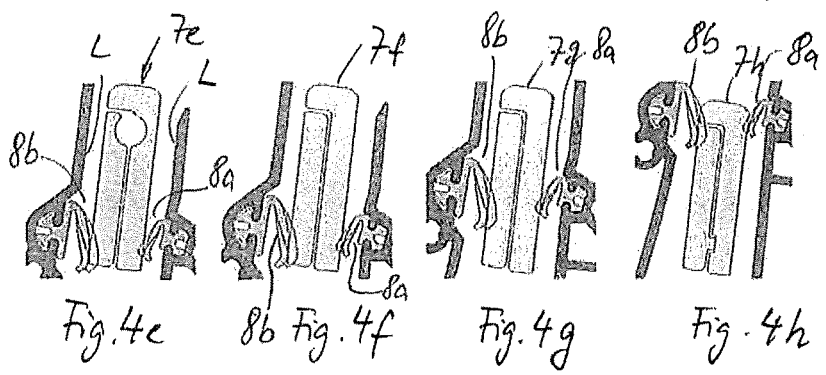

SHADING DEVICE FOR A PANE OR A GLASS ROOF REGION OF A VEHICLE INTERIOR

TECHNICAL FIELD

The invention relates to a shading device for a pane or a glass roof region of a vehicle interior, with a flexible shading structure which is mounted so as to be movable between a rest position, in which it is stowed in a receiving region in a compact manner, and a shading position, in which it spans the pane or the glass roof region, and which is provided with a dimensionally stable pull-out profile at its front end region in the spanning direction, which pull-out profile extends at least largely over an entire width of the shading structure and is positioned in a passage slot of the receiving region in the rest position of the shading structure.

BACKGROUND

A shading device of this kind is generally known for rear side panes of passenger cars. A shading device of this kind has a flexible shading structure, which is mounted on a winding shaft so as to be able to be wound up and unwound. The winding shaft is positioned in a receiving region behind a door trim panel underneath a vehicle sill and is mounted rotatably in the receiving region. At its front end region in the pull-out direction, the flexible shading structure has a dimensionally stable pull-out profile which is guided displaceably in lateral guides, rigidly connected to the door, at its opposite end faces in the vertical direction of the vehicle and thus transfers the shading structure from a rest position to a shading position. In the rest position of the shading structure, the pull-out profile is also stowed underneath the vehicle sill in the receiving region behind the door inner trim panel. The receiving region has a passage slot which extends over the entire length of the pull-out profile and allows the pull-out profile to lower into the receiving region and to move out of the receiving region in the direction of the shading position. The length of the passage slot is slightly greater than the length of the pull-out profile, in order to allow the pull-out profile to pass through.

The object of the invention is to make available a shading device of the type mentioned at the outset, which permits reliable and quiet positioning of the pull-out profile in the receiving region.

This object is achieved by the fact that elastically resilient damping elements are arranged on opposite longitudinal walls of the passage slot, which damping elements flank the pull-out profile in the rest position of the shading structure and support the pull-out profile at a distance from the longitudinal walls. According to the invention, it is possible either for an individual damping element to be provided on each of the two opposite longitudinal walls of the passage slot, or for a plurality of damping elements to be provided in the region of each longitudinal wall and distributed over the length of the respective longitudinal wall. The solution according to the invention means that the pull-out profile, in the rest position of the shading structure, is centered in the receiving region and held spaced apart from the longitudinal walls of the passage slot. This prevents the pull-out profile from striking the longitudinal walls of the passage slot or of the receiving region while a corresponding motor vehicle is being driven, which could lead to noises. In addition, wear of the pull-out profile is also reduced, since the pull-out profile does not bear directly on the longitudinal walls of the passage slot and, accordingly, cannot rub along these longitudinal walls. The passage slot can preferably be closed by a cover, which is transferred to an open position or a closed position depending on a state of the pull-out profile. The solution according to the invention is particularly advantageously suitable for use in passenger cars, preferably for shading side panes of a rear region of the passenger car. In the same way, the shading device according to the invention is provided for shading a rear window or also for shading a glass roof region of the passenger car. The shading device according to the invention can also be used in heavy goods vehicles and utility vehicles such as buses or in rail vehicles.

In one embodiment of the invention, the damping elements are configured as elastomeric lugs which are held on the longitudinal walls of the passage slot and protrude freely toward a center of the passage slot. Toward a center of the passage slot signifies that the elastomeric lugs protrude inward into the passage slot with a component in the direction of an opposite longitudinal wall. Preferably, the elastomeric lugs protrude downward from an upper face of the passage slot into the receiving region, preferably obliquely downward.

In a further embodiment of the invention, several elastomeric lugs are provided on each longitudinal wall and are arranged at a distance from each other in the longitudinal direction of the passage slot. Preferably, the elastomeric lugs on each longitudinal wall are arranged at uniform intervals.

In a further embodiment of the invention, the elastomeric lugs on the opposite longitudinal walls are in each case arranged lying diametrically opposite each other in pairs. In this way, the diametrically opposite elastomeric lugs form pairs that support the pull-out profile between them.

In a further embodiment of the invention, the elastomeric lugs on the opposite longitudinal walls are alternatingly offset in relation to each other in the longitudinal direction. In this way, the mutually offset elastomeric lugs on the opposite longitudinal walls can each protrude into corresponding gaps between the elastomeric lugs of the respective other longitudinal wall, without bearing on each other.

In a further embodiment of the invention, an individual elastomeric lug is provided on each longitudinal wall and in each case extends at least over a large part of a length of the passage slot. Accordingly, the two elastomeric lugs on the opposite longitudinal walls each have a length which corresponds at least to a large part of a length of the passage slot, preferably at least 70% of a length of the passage slot.

In a further embodiment of the invention, each elastomeric lug has a keder profile which is held in a keder groove of the corresponding longitudinal wall of the passage slot. In this way, each elastomeric lug can be drawn into the corresponding keder groove of the longitudinal wall of the passage slot or of the receiving region.

In a further embodiment of the invention, the longitudinal walls are part of a cassette housing which constitutes the receiving region for the shading structure. The cassette housing supports a winding shaft, on which the flexible shading structure is held so as to be able to be wound up and unwound. The cassette housing is mounted rigidly on the vehicle. If the shading device is provided in the region of a side pane of a rear side door, the rigid mounting of the cassette housing on the vehicle is to be understood as a rigid mounting of the cassette housing on the door.

In a further embodiment of the invention, each elastomeric lug has at least one wing portion which integrally adjoins the keder profile and which protrudes freely from the longitudinal wall toward the center of the passage slot. The wing portion is elastically resilient and can conform to the pull-out profile as soon as the pull-out profile is positioned at the height of the elastomeric lugs in the passage slot. Accordingly, the pull-out profile is elastically supported and centered between opposite wing portions of the elastomeric lugs.

In a further embodiment of the invention, each elastomeric lug has several wing portions which are separate from each other and which are each arranged in one piece with the keder profile of the elastomeric lug. The separation of the wing portions is preferably effected by incisions or slits which extend from the freely protruding end regions of the wing portions in the direction of the keder profile and thus form wing portions which are arranged next to one another in the longitudinal direction of the passage slot and which are elastically resilient independently of one another.

In a further embodiment of the invention, each wing portion is arranged integrally on the keder profile by means of a materially uniform flexure bearing, and each wing portion protrudes from the flexure bearing into the passage slot counter to the pull-out direction of the pull-out profile. In this way, wing portions and keder profiles can be produced in one piece from a suitable elastomeric material. Instead of a single elastomeric material, it is also possible, in particular by co-extrusion, to produce the keder profile and the at least one wing portion of each elastomeric lug from different plastics and yet maintain the integrity between wing portions and keder profiles.

In a further embodiment of the invention, each wing portion, in the unloaded initial state, protrudes at an angle from the longitudinal wall. The inclination of each wing portion extends with direction components to a vertical midplane of the passage slot and downward into the interior of the receiving region, wherein each wing portion, seen in cross section, can have different inclinations in the course of its extent from the keder profile toward its free end. In other words, the respective wing portion can be curved in cross section or can extend in a straight line.

In a further embodiment of the invention, each keder groove extends continuously along an entire length of the longitudinal wall and is open toward at least one end face of the longitudinal wall. In this way, it is possible for a keder profile of the corresponding elastomeric lug to be drawn from an end face of the longitudinal wall into the corresponding keder groove.

Further advantages and features of the invention will become clear from the claims and also from the following description of preferred exemplary embodiments of the invention illustrated, with reference to the drawings.

BRIEF DESCRIPTION OF THE DRAWINGS

FIG. 1 shows a schematic sectional view of an embodiment of a shading device according to the invention for a side pane of a vehicle door, in the state when mounted ready for operation, FIG. 2 shows the view according to FIG. 1, in a slightly changed intermediate position of a pull-out profile, FIG. 3 shows an enlarged detail of the view according to FIG. 2, FIGS. 4a to 4h show schematic views of various embodiments of shading devices according to the invention with differently configured pull-out profiles.

DETAILED DESCRIPTION

Figure 5:
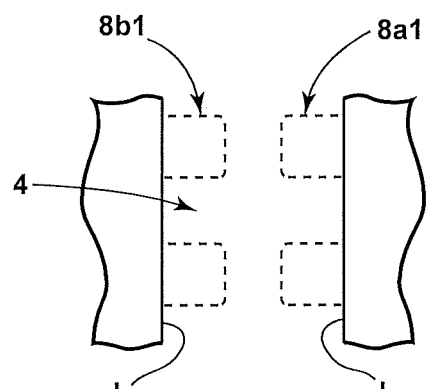
FIGS. 5 and 6 are diagrammatic plan views of additional embodiments of the shading device illustrating several elastomeric lugs.

A shading device 1 according to FIGS. 1 to 3 is provided to shade a side pane of a vehicle door 2, which is shown only partially in cross section in FIGS. 1 to 3. The shading device 1 has a receiving region 3 in the form of a cassette housing, which is rigidly connected to corresponding door body portions of the vehicle door 2. The receiving region 3 extends in the region of a door inner face along the vehicle door 2 and is positioned underneath a door sill, which is arranged at the height of a vehicle sill. A side pane of the vehicle door 2 extends above the door sill. The shading device 1 is positioned with its receiving region 3 between a door inner trim panel (not shown) and the door body portions of the vehicle door 2. The receiving region 3 is open along its length toward the top in the vertical direction of the vehicle and forms a passage slot 4. The passage slot 4 can be closed and opened by a pivotably mounted cover D, which ends with its surface flush with the door sill and accordingly flush with an upper face of the door inner trim panel. The cover D forms a one-piece component which extends over the entire length of the passage slot 4 and thus over at least almost the entire length of a side pane of the vehicle door 2.

In the vertical direction of the vehicle, the side pane is flanked on opposite sides by a respective door frame, in which in each case a guide rail 5 is arranged which is assigned to the shading device 1. The two guide rails 5 in the region of the opposite door frames of the side pane serve to guide end faces of a pull-out profile 7 of the shading device 1, which pull-out profile 7 has a dimensionally stable configuration. The pull-out profile 7 is secured on a front end region, in the pull-out direction, of a flexible shading structure B. The shading structure B is held on a winding shaft 6 so as to be able to be wound up and unwound, which winding shaft 6 is mounted rotatably in the cassette housing serving as receiving region 3. The winding shaft 6 extends in the longitudinal direction of the receiving region 3 and therefore at least largely in the longitudinal direction of the vehicle. By means of the pull-out profile 7, the shading structure B can be pulled out from a rest position, in which it is stowed in the receiving region 3, upward through the passage slot 4 from an upper edge of a door frame of the vehicle door 2, in order to be transferred to its shading position, in which the side pane is at least largely completely covered on the inside by the shading structure B.

By means of guide members (not shown in detail), the pull-out profile 7 is mounted with its opposite end faces in the guide rails 5 of the vehicle door 2 so as to be displaceable in parallel in the vertical direction of the vehicle. In order to move the pull-out profile 7 between a rest position, in which it is retracted into the receiving region 3, and a functional position, in which it is deployed as far as an upper edge of the side pane and of the door frame, a drive device (not shown) is provided which comprises an electrical drive motor and suitable drive transmission means in the form of flexible threaded shafts that cooperate with the guide members of the end faces of the pull-out profile 7 and that are routed longitudinally in the region of the guide rails 5 of the lateral door frames.

It will be seen from FIGS. 1 to 3 that a thickness of the pull-out profile 7 is less than a width of the passage slot 4. In order to ensure that in the rest position, in which the pull-out profile 7 is retracted into the receiving region 3, said pull-out profile 7 is supported securely and free from rattling, even with a large length of the pull-out profile 7 and with a correspondingly large length of the passage slot 4, elastically resilient damping elements are provided internally on opposite longitudinal walls L of the receiving region 3 and therefore of the passage slot 4, which damping elements are designed as elastomeric lugs 8a, 8b. Each elastomeric lug 8a, 8b is produced in one piece from an elastomeric material and in each case has a wing portion 9a, 9b which is integrally connected to a keder profile 10a, 10b in each case via a flexure bearing or flexible hinge member 12a, 12b. The keder profiles 10a, 10b of the elastomeric lugs 8a, 8b are held with form-fit engagement in keder grooves 11a, 11b of the opposite longitudinal walls L of the receiving region 3, the free cross-sectional profile of the keder grooves 11a, 11b being adapted to a cross-sectional profile of the keder profiles 10a, 10b. Details of the form-fit reception of the keder profiles 10a, 10b in the complementary keder grooves 11a, 11b can be seen clearly in FIG. 3. The keder grooves 11a, 11b are formed integrally in the opposite longitudinal walls L of the receiving region 3, i.e. of the cassette housing.

The keder profiles 10a, 10b have profile portions that engage in the respective keder groove 11a, 11b. In addition, each keder profile 10a, 10b also has a further support profile portion which extends toward the center of the passage slot 4 and which is open toward the center of the passage slot 4 by way of an open slot region of each keder groove 11a. The corresponding support profile portions of the keder profiles 10a, 10b also bear internally on the longitudinal walls L. The flexure bearings 12a, 12b are integrally formed in the region of an upper face of the respective support profile portions and provide an integrally formed hinge for the wing portions 9a, 9b. The wing portions 9a, 9b are elastically pivotable via the flexure bearings 12a, 12b. Starting from the flexure bearing 12a, 12b, each wing portion 9a, 9b extends, on the one hand, toward the center of the passage slot 4 and, on the other hand, downward in the direction of the winding shaft 6. In the unloaded rest position of the shading structure B according to the views in FIGS. 1 to 3, both wing portions 9a, 9b are inclined with respect to a vertical longitudinal plane in which the shading structure B extends. The correspondingly obliquely downwardly directed orientation of the wing portions 9a, 9b can be seen clearly in FIG. 3. Free end regions of the wing portions 9a, 9b have a rounded configuration, wherein the wing portion 9b additionally has, at the free end region thereof, a curvature in the direction of the adjacent longitudinal wall L.

In the exemplary embodiment shown, each of the two elastomeric lugs 8a, 8b extends continuously within the respective keder groove 11a, 11b over at least a large part of the length of the pull-out profile 7. The two keder grooves 11a and 11b also extend continuously over the entire length of the receiving region 3, and therefore of the longitudinal walls L, in the region of the passage slot 4 and are open toward end faces of the longitudinal walls L. It is thus possible that the two elastomeric lugs 8a, 8b with their keder profiles 10a, 10b are pulled from the direction of an end face into the keder grooves 11a, 11b of the longitudinal walls L. Accordingly, in the retracted state ready for operation, the two elastomeric lugs 8a and 8b flank the pull-out profile 7 in its rest position continuously along its entire length in the manner of sealing or supporting lips. As soon as the pull-out profile 7 is driven from a deployed functional position to the rest position inside the passage slot 4, the wing portions 9a, 9b are forced outward by the pull-out profile 7 in the direction of the respectively adjacent longitudinal wall L, wherein mutually facing inner surfaces of the opposite wing portions 9a, 9b accordingly conform to the outer face of the pull-out profile 7 under elastic deformation of the elastomeric lugs 8a, 8b. The elastomeric lugs 8a, 8b accordingly apply a supporting force to the pull-out profile 7 in the direction of the center of the passage slot 4, as a result of which the pull-out profile 7 in the rest position is held centered between the elastomeric lugs 8a, 8b and at the same time is positioned at a distance from the longitudinal walls L. As soon as the pull-out profile 7 is again driven upward in the direction of a deployed functional position, the wing portions 9a, 9b of the elastomeric lugs 8a, 8b pivot back to the unloaded starting position, in which they are inclined obliquely inward toward the center of the passage slot and remain at a distance from each other, in order to allow the shading structure B to pass through between these elastomeric lugs 8a, 8b without friction.

In exemplary embodiments of the invention that are not shown here, the wing portions 9a, 9b are provided with separating slots spaced apart from each other in the longitudinal direction of the passage slot 4, in order to obtain a large number of wing portions that are arranged one after another and are pivotable independently of one another. This permits further improved adaptation for the lateral support of a pull-out profile, particularly one of great length, without the wing portions twisting or warping. Such twisting or warping can occur if, in the case of an elastomeric lug of relatively great length, a single wing portion is provided that extends continuously over the entire length.

Alternatively, in an embodiment of the invention likewise not shown here, it is possible to provide on each side, i.e. along each longitudinal wall L, a plurality of short elastomeric lugs which are at a distance from each other and separated from each other and which are flush with one another in the longitudinal direction and are drawn individually with correspondingly short keder profiles into the continuous keder groove. In this way, the mutual spacings of the individual elastomeric lugs in the longitudinal direction of the passage slot 4 can be chosen freely.

With reference to the embodiments shown schematically in FIGS. 4a to 4h, differently configured pull-out profiles are provided, which differ from one another both in terms of their cross-sectional configuration and also in terms of their width and their height. The elastic resiliency of the elastomeric lugs 8a, 8b can be readily discerned from the schematically depicted orientation of the elastomeric lugs 8a, 8b in the unloaded rest position and in the position bearing on the respective pull-out profile 7. It can also be seen from this that the elastomeric lugs 8a, 8b are suitable not just for a single shape and size of a pull-out profile but also for several different configurations of pull-out profiles 7. In order to illustrate the different configuration of the pull-out profiles 7, the pull-out profiles 7 in the different views are provided with different lower-case letters a to h.

In a further embodiment of the invention shown in FIG. 5, several elastomeric lugs 8a1, 8b1 are provided on each longitudinal wall L and are arranged at a distance from each other in the longitudinal direction of the passage slot 4. Preferably, the elastomeric lugs 8a1, 8b1 on each longitudinal wall L are arranged at uniform intervals. Further, in one embodiment the elastomeric lugs 8a1, 8b1 on the opposite longitudinal walls L are in each case arranged lying diametrically opposite each other in pairs. In this way, the diametrically opposite elastomeric lugs 8a1, 8b1 form pairs that support the pull-out profile (not shown here) between them.

Figure 6:
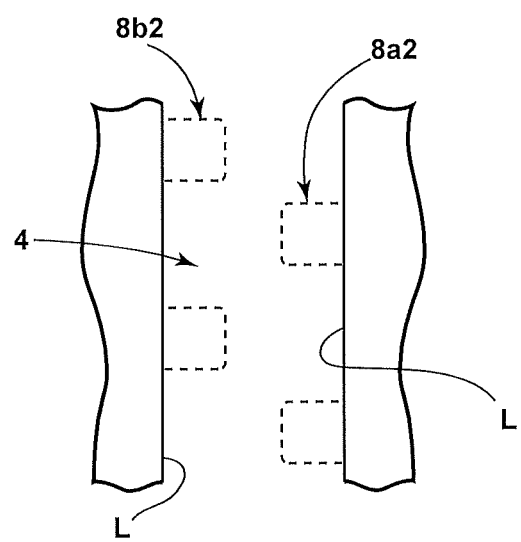

In a further embodiment of the invention shown in FIG. 6, the elastomeric lugs 8a2, 8b2 on the opposite longitudinal walls L are alternatingly offset in relation to each other in the longitudinal direction. In this way, the mutually offset elastomeric lugs 8a2, 8b2 on the opposite longitudinal walls can each protrude into corresponding gaps between the elastomeric lugs of the respective other longitudinal wall, without bearing on each other.

Figure 7:
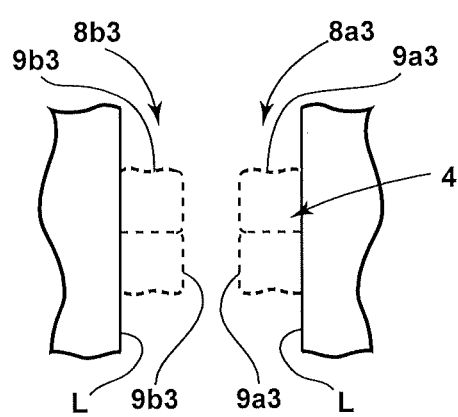
FIG. 7 is a diagrammatic plan view of a further embodiment of the shading device illustrating elastomeric lugs with several wing portions.

In a further embodiment of the invention shown in FIG. 7, each elastomeric lug 8a3, 8b3 has several wing portions 9a3, 9b3 which are separate from each other and which are each arranged in one piece with the keder profile of the elastomeric lug. The separation of the wing portions is preferably effected by incisions or slits which extend from the freely protruding end regions of the wing portions in the direction of the keder profile and thus form wing portions which are arranged next to one another in the longitudinal direction of the passage slot 4 and which are elastically resilient independently of one another.

The invention claimed is:

1. A shading device for a window of a vehicle interior, said shading device comprising:
   a flexible shading structure mounted for movement between a rest position in which said shading structure is stowed in a receiving region in a compact configuration and a shading position in which said shading structure spans a vehicle window, said shading structure having a front end region, said front end region being a leading portion of said shading structure when moved from the rest position to the shading position;
   a dimensionally stable pull-out profile connected to said front end region of said shading structure, said pull-out profile extending along a substantial part of a width of said shading structure, said pull-out profile being positioned in a passage of said receiving region in the rest position of said shading structure; and
   elastically resilient damping elements respectively disposed on opposite longitudinally-extending walls of said passage, said damping elements being configured as elastomeric lugs, said elastomeric lugs being disposed to flank said pull-out profile in the rest position of said shading structure and protruding freely toward a center of said passage, said elastomeric lugs being disposed in supportive engagement with said pull-out profile in the rest position of said shading structure to maintain said pull-out profile at a distance from said walls of said passage in the rest position.

2. The shading device according to claim 1, wherein a single said elastomeric lug is disposed on each said wall, and each said elastomeric lug extends along a substantial portion of a length of said passage.

3. The shading device according to claim 1, further including a cassette housing, said walls forming parts of said cassette housing and said cassette housing defining said receiving region in which said shading structure is stowed in the rest position.

4. The shading device according to claim 1, wherein said elastomeric lugs each project toward the center of said passage and are configured and disposed to exert a supporting force on said pull-out profile in a direction towards the center of said passage in the rest position of said shading structure to maintain said pull-out profile at a distance from said walls.

5. The shading device according to claim 1, wherein said shading structure is movable in a pull-out direction when moved from the rest position towards the shading position, each said elastomeric lug comprises a wing portion projecting from the respective said wall both inwardly into said passage towards the center thereof and in a direction opposite to the pull-out direction, and said wing portions of the respective said elastomeric lugs are configured and disposed to exert a supporting force on said pull-out profile in the rest position of said shading structure to maintain said pull-out profile at a distance from said walls.

6. The shading device according to claim 1, wherein said passage is elongated and defines a longitudinal direction, and a plurality of said elastomeric lugs are disposed along each said wall at a distance from one another in the longitudinal direction.

7. The shading device according to claim 6, wherein said elastomeric lugs located on one of said walls are disposed diametrically opposite respective ones of said elastomeric lugs located on the other of said walls.

8. The shading device according to claim 6, wherein said elastomeric lugs located on one of said walls are oriented in an alternating longitudinally-offset manner in relation to said elastomeric lugs located on the other of said walls.

9. The shading device according to claim 1, wherein each said wall comprises a keder groove, and each said elastomeric lug comprises a keder profile disposed in said keder groove of the corresponding said wall.

10. The shading device according to claim 9, wherein said shading structure is movable in a pull-out direction when moved from the rest position towards the shading position, and each said keder groove extends continuously along an entire length of the corresponding said wall and opens at one end thereof in a direction substantially perpendicular to the pull-out direction.

11. The shading device according to claim 9, wherein each said elastomeric lug comprises at least one wing portion integral with said keder profile, said wing portion having an inner end portion disposed immediately adjacent said keder profile, and said wing portion projecting away from the corresponding said wall toward the center of said passage and terminating at a free outer end portion disposed in supportive engagement with said pull-out profile in the rest position of said shading structure.

12. The shading device according to claim 11, wherein each said elastomeric lug comprises a plurality of separate said wing portions formed in one-piece with said keder profile.

13. The shading device according to claim 11, wherein said shading structure is movable in a pull-out direction when moved from the rest position towards the shading position, each said wing portion is connected to said keder profile by a flexure bearing integral with said keder profile and said wing portion, said flexure bearing, said keder profile and said wing portion of each said elastomeric lug being constructed of a uniform material, and each said wing portion projecting from the corresponding said flexure bearing into said passage in a direction counter to the pull-out direction of said shading structure.

14. The shading device according to claim 13, wherein each said wing portion projects from the corresponding said wall at an angle in the rest position of said shading structure.

15. A shading device for a window region of a vehicle interior, said shading device comprising:
   a pair of walls disposed in a spaced-apart manner so as to define a passage therebetween, said passage opening outwardly along one end thereof through a slot;
   a flexible shading structure mounted for movement between a retracted stored position in which said shading structure is disposed in said passage and an extended use position in which at least part of said shading structure extends outwardly through said slot and is oriented in superimposed relation with a window region to shade same, said shading structure being movable in a pull-out direction when moved from the retracted stored position towards the extended use position, said shading structure having a first end region mounted adjacent an inner end of said passage and a second end region spaced from said first end region;

a pull-out profile fixed to said second end region of said flexible shading structure, said pull-out profile extending along a substantial portion of a width of said shading structure and being disposed in said passage in the retracted stored position of said shading structure; and an elastically resilient damping element disposed on each of said walls adjacent oppositely outwardly facing sides of said pull-out profile when said shading structure is in the retracted stored position, each said damping element comprising an elastomeric lug projecting inwardly from the respective said wall towards the opposite said wall, each said elastomeric lug comprising a wing portion projecting from the respective said wall both inwardly into said passage towards the center thereof and in a direction opposite to the pull-out direction, and said wing portions of the respective said elastomeric lugs are configured and disposed to exert a supporting force on said pull-out profile towards the center of said passage when said shading structure is in the retracted stored position to maintain said pull-out profile spaced-apart from the respective said walls.

16. The shading device according to claim 15, further including a cassette housing defining a receiving region therein including said passage, said walls forming opposed portions of said cassette housing, said shading structure and said pull-out profile being disposed between said walls within said cassette housing in the retracted stored position of said shading structure.

17. A shading device for a window region of a vehicle interior, said shading device comprising:
a cassette housing defining a receiving region and including a pair of walls forming opposed portions of said cassette housing, said walls being disposed in a spaced-apart manner so as to define a passage therebetween which forms part of said receiving region, said passage opening outwardly along one end thereof through a slot;
a flexible shading structure mounted for movement between a retracted stored position, in which said shading structure is disposed in said passage and between said walls within said cassette housing, and an extended use position in which at least part of said shading structure extends outwardly through said slot and is oriented in superimposed relation with a window region to shade same, said shading structure being movable in a pull-out direction when moved from the retracted stored position towards the extended use position, said shading structure having a first end region mounted adjacent an inner end of said passage and a second end region spaced from said first end region;

a pull-out profile fixed to said second end region of said flexible shading structure, said pull-out profile extending along a substantial portion of a width of said shading structure and being disposed in said passage and between said walls within said cassette housing in the retracted stored position of said shading structure; and an elastically resilient damping element disposed on each of said walls adjacent oppositely outwardly facing sides of aid pull-out profile when said shading structure is in the retracted stored position, each said damping element comprising an elastomeric lug projecting inwardly from the respective said wall towards the opposite said wall, each said wall defining therein a groove which opens inwardly towards the center of said passage, each said elastomeric lug including a profile portion engaged within said groove and having a shape which conforms thereto, each said elastomeric lug further including a wing portion having an inner end connected to said profile portion by a flexible hinge member and an outer portion projecting from said hinge member both inwardly into said passage towards the center thereof and in a direction opposite to said pull-out direction, and said wing portions of the respective said elastomeric lugs are configured and disposed to exert a supporting force on said pull-out profile towards the center of said passage when said shading structure is in the retracted stored position to maintain said pull-out profile spaced-apart from the respective said walls.

18. The shading device according to claim 17, further including a winding shaft disposed in said cassette housing adjacent the inner end of said passage, said first end region of said shading structure being fixed to said winding shaft, part of said shading structure being wound around said winding shaft in the retracted stored position and unwound from said winding shaft when said shading structure is moved from the retracted stored position to the extended use position.

* * * * *